ROTARY TUNER

Filed Sept. 11, 1958

2 Sheets-Sheet 1

INVENTOR.

Reynald E. Thompson

BY Mueller & Aichele

Attys.

May 9, 1961 R. E. THOMPSON 2,983,885

ROTARY TUNER

Filed Sept. 11, 1958 2 Sheets-Sheet 2

INVENTOR.
Reynald E. Thompson
BY Mueller & Aichele
Attys.

United States Patent Office 2,983,885
Patented May 9, 1961

2,983,885

ROTARY TUNER

Reynald E. Thompson, Mount Prospect, Ill., assignor to Motorola, Inc., Chicago, Ill., a corporation of Illinois Filed Sept. 11, 1958, Ser. No. 760,321
16 Claims. (Cl. 336—45)

This invention relates to a new and improved tuner for automobile radio receivers, and more particularly to a small and compact preset tuner for providing automatic selection of a number of radio frequencies received by radio receivers.

Radio receivers have been provided with many different types of preset tuners to afford automatic or "pushbutton" selection of stations. Some of the known preset tuners have been rather bulky and complicated, and a tuner of reduced size would have important advantages in many applications. This is particularly true of tuners used with automobile radio receivers which are generally mounted along with other instruments and devices on the car's dashboard. In recent years automobile manufacturers have found is desirable to provide a rather large number of dashboard-mounted indicating and control devices of various types, and consequently it is becoming increasingly important to conserve the limited mounting space available on the dashboard. The recent availability of smaller radio receivers, which has been facilitated by the use of transistors to replace some or all of the tubes, has been important step in the desired direction. However, the need for a small and efficient preset tuner suitable for use with such modern receivers has not been entirely satisfied by known constructions.

Accordingly, it is an object of the present invention to provide a new and improved preset tuner of small size and rugged construction.

Another object of the invention is to provide a preset tuner of the permeability type with a reciprocal positioning mechanism having a rotary stop and a simple and compact manual selector and actuating mechanism.

Another object of the invention is to provide a small and compact tuner for use with an automobile radio receiver, having one rotary control for continuous tuning, and having another rotary control for automatically selecting predetermined radio frequencies.

A feature of the invention is the provision of a tuner for radio receivers having cores which are variously positioned in tuning coils, wherein the cores are moved by a spring biased reciprocal carriage and a stop member moves with the carriage and simultaneously rotates so as to cooperate with different preset abutments, with a manually controlled rotary selector mechanism causing both the reciprocal and rotary movement of the stop member.

Another feature of the invention is the provision of a tuner as described in the preceding paragraph in which the core carriage has a roller thereon and the rotary selector mechanism includes a manually rotatable annular toothed cam which engages the roller to move the carriage reciprocally. The carriage stop member may be slidably keyed to a shaft for the cam so that it is moved both rotationally and linearly.

A further feature of the invention is the provision of a preset tuner having a core positioning mechanism in which different tuning positions are defined by preset abutments carried on worm screws, and with the tuner having a manual rotary selector control which rotates a traveling screwdriver into alignment with the screws to facilitate setting up or adjusting the stations for selection. A visual indicator may be provided to aid in the setting up operation.

Still another feature of the invention is the provision of a small compact tuner for use with automobile radio receivers, having a rotary selector control for selecting between several preset tuning positions defined by adjustable abutments, and having a manual tuning control connected to one of the abutments to permit continuous manual tuning through the entire range of the tuner when the selector control is rotated to a manual selection station. A tone indicator device may be provided to sound a tone when the selector control reaches the manual station for announcing the condition of the tuner to the operator.

The invention is illustrated in the accompanying drawings in which.

The invention provides a small, compact tuner which is particularly suited for use with radio receivers provided in automobiles where mounting space limitations may be an important consideration. The tuner is a permeability type having cores which are moved reciprocally in and out of tuning coils by manually rotating a selector control. The rotary movement of the selector is directly converted into reciprocal movement of the cores by a rotary cam having a cylindrical toothed edge which cooperates with a cam follower provided on a spring biased carriage for the cores. A carriage stop member is slidably connected to a shaft for the cam and is rotatably connected to the carriage. An abutment member is positioned in each of the various paths followed by a lug on the carriage stop member during its return movement. When the selector is rotated, the cam acts on the cam follower and pushes the carriage and its stop member away from the abutment then holding it. The carriage stop member is simultaneously rotated to a position where the next abutment member in the sequence intercepts it during return movement. The abutment members may be threaded on worm screws which are adjusted to preset the tuning positions of the carriage. A cylindrical shell is provided with slots which guide the cam follower and the abutment members. The selector may be provided with a traveling screwdriver which moves therewith into alignment with the abutment screw for each preset position to facilitate changing the tuning positions of the carriage. For continuous tuning, one of the abutment screws is geared to a manual control shaft. The cylindrical shape of the toothed cam conserves space, and the cam also reduces the number of working parts required. Thus, the tuner may be quite small, and for example, a specific embodiment occupies only about eight cubic inches of space behind the panel on which it is mounted.

Figures 1, 2, 4, 5:
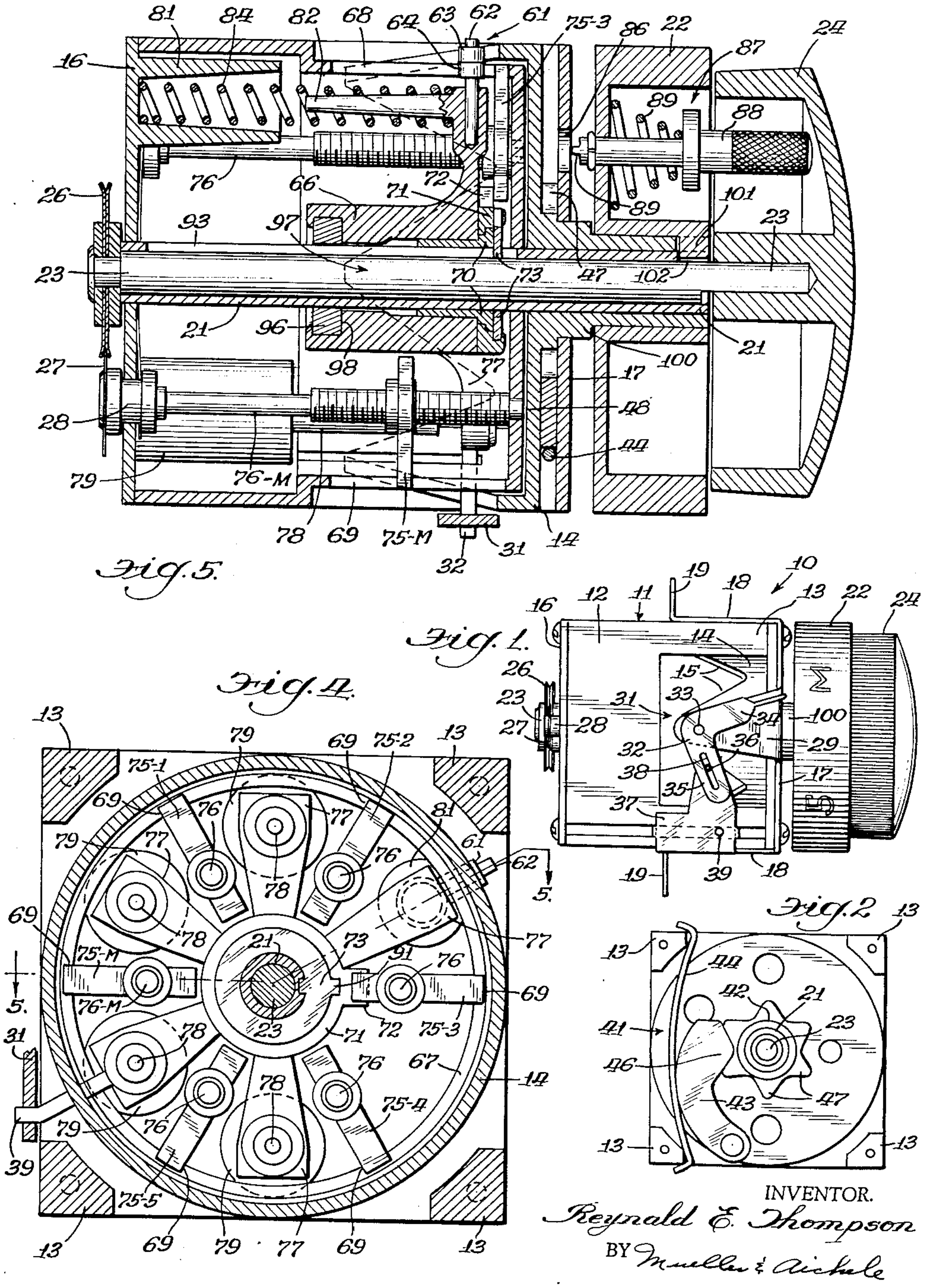
Fig. 1 is a side view of a tuner assembly in accordance with the invention showing the visual tuning indicator.
Fig. 2 is an end view of the tuner of Fig. 1 with the control knobs and end-plate removed showing the detent mechanism.
Fig. 4 is a transverse sectional view taken along line 4—4 of Fig. 3.
Fig. 5 is a longitudinal sectional view taken along line 5—5 of Fig. 4.

In Fig. 1 there is shown a complete tuner assembly 10 in accordance with the invention including a housing 11 having a generally rectangular portion 12 at one end and four corner posts 13 at the other end. End-plates 16 and 17 are secured to the housing 11 by suitable fasteners such as screws, and the end-plate 17 may be provided with legs 18 having projecting flanges 19 which may be fastened to a support behind the dashboard of an automobile to mount the tuner. Part of the selector mechanism of the tuner, including the cylindrical toothed edge 15 of the rotary cam 14, may be seen through an opening in the housing 11 between the corner posts 13. The selector mechanism is controlled by a station selector knob 22 which is marked with numbers according to the number of preset selections provided by the tuner. The knob 22 may be turned to rotate the cam 14 to various selection stations which may be indicated by numbers on the knob 22 as shown. In one of the selection stations, marked M on knob 22, a manual tuning mechanism including gears 26 and 27 driven by a shaft 23 may be operated by turning the manual tuning knob 24.

The visual automatic selection indicating mechanism 31 shown in Fig. 1 includes a pivoted member 32 connected by a pivot pin 33 to a tongue portion 29 of the end-plate 17. The indicating mechanism 31 may be connected to a pin 39 on the carriage which moves reciprocally along the length of the tuner 11 when the selector knob 22 is rotated, as will be explained later. Member 32 has a pointer arm 34 whose end bends around to the front of the end-plate 17. A suitable scale may be provided under the pointer to indicate visually the radio frequencies or channels which have been preset for automatic selection. Member 32 has a drive arm 35 connected by the pin 36 to a slide member 37 which is driven reciprocally by the pin 39. The slide member 37 is moved to different positions along the length of the tuner 11 as the member 22 is turned to different selection stations, and pin 36 slides in aperture 38 and causes the pointer arm 34 to move pivotally.

In the end view of the tuner 11 shown in Fig. 2, the knobs 22 and 24 and the end-plate 17 are omitted to reveal the detent mechanism 41 which stops the selector mechanism at the desired automatic and manual selection stations. A star wheel wheel 42 is carried by the shaft 21 as it rotates. A pivotal detent arm 43 is biased against the star wheel 42 by a wire spring 44 whose opposite ends are supported on two of the corner posts 13. The projection 46 on the detent arm 43 urges the star wheel 42 to the various selection stations which are defined by the low points between the teeth 47.

Figure 3:
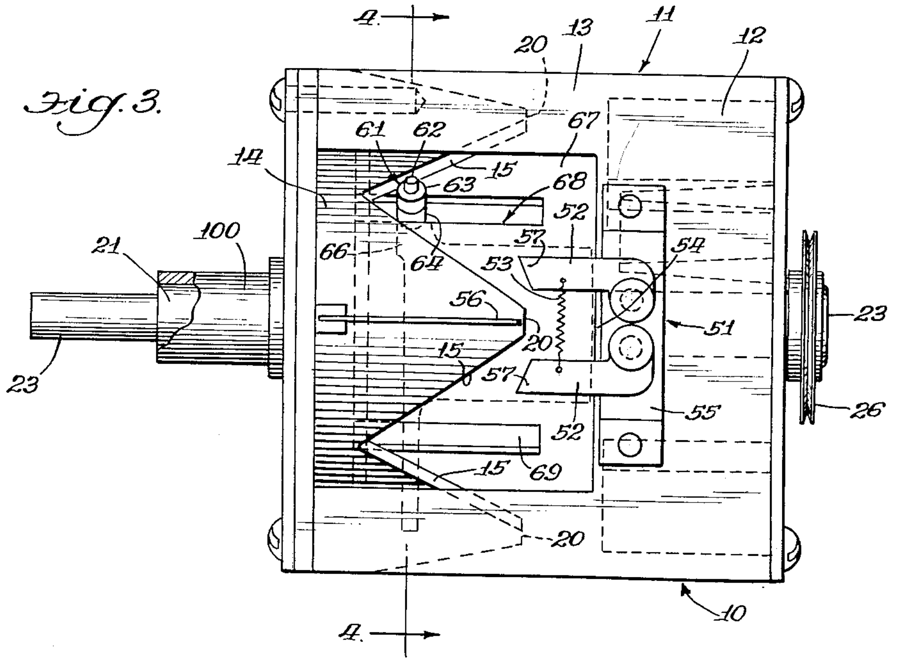
Fig. 3 shows the tuner of Fig. 1 viewed from the opposite side to illustrate the tone indicator.

In Fig. 3 there is shown the tuner assembly 10 of Fig. 1 viewed from the opposite side. The tone indicator mechanism 51 provides a sound which is clearly audible over the normal operating noises of an automobile when the selector mechanism is turned to the manual selection station. The mechanism 51 includes a pair of pivotal pawls 52 which are biased by a spring 53 against opposite edges of a flange 54 on a mounting base 55. The base 55 may be secured to the rectangular end portion 12 of the housing 11 with the pawls 52 directed toward the toothed edge 15 of the cam 14. A tone reed 56 may be mounted rigidly on one of the teeth of the cam 14 so that it projects out slightly. One end of the reed 56 is aligned with the tips 57 of the pawls 52 so that if the cam 14 is turned in either direction from the position shown, the reed 56 will engage the end of one of the pawls. The pawl engaged will then pivot to allow the reed to pass, and the spring 53 will return the pawl 52 to its original position. If the selector mechanism is then returned to the manual station as illustrated in Fig. 3, the tip 57 of one of the pawls 52 will be in the path of the end of the reed. The pawls 52 are held firmly by the stop flange 54, but the reed is quite flexible and will bend to allow the selector mechanism to reach the manual station. As the reed passes one of the pawls 52 it is released suddenly and starts to vibrate, thus sounding a tone which indicates to the operator that the tuner is conditioned for manual operation. This helps the driver of the automobile in which the tuner is provided to select the manual tuning station M without taking his eyes off the road.

Certain features of the construction and operation of the selector mechanism of the tuner may be seen most readily in Fig. 3. The cam 14 has a tubular extension 100 which is partially broken away to reveal the tubular selector shaft 21 therein. The manual control shaft 23 is disposed coaxially within shaft 21. The cam follower 61 is carried on a pin 62 connected to the core carriage 66 shown by dotted lines. The core carriage 66 is movable along the shaft 21. A cylindrical shell 67 which may be cast integrally with the housing 11 fits inside the cylindrical toothed edge 15 of cam 14 and surrounds the core carriage 26. The pin 62 extends from the carriage 66 through an elongated opening 68 in the shell 67 which serves to support the pin and guide its movement. The cam follower 61 includes two rollers 63 and 64 mounted side by side on the pin 62, with the roller 64 engaging the edge of the guide opening or slot 68 and with the roller 63 being aligned with the toothed edge 15 of the cam 14. Thus, when the cam 14 is rotated, the edge 15 bears against roller 63 and applies a force which pushes the carriage 66 away from its rest position. As the carriage 66 moves, the roller 64 rolls along the edge of the guide slot 68. Simultaneously, the roller 63 is rolled in the opposite rotational direction by the edge 15 of cam 14. When the end of the tooth is reached, the carriage is at the limit of its range of movement, and it is held there briefly while roller 63 rolls along the flat point 20 on the tooth. When the flat point 20 on the tooth of the cam 14 passes roller 63, the roller will follow the other side of the tooth as the cam is turned further. The carriage 66 is spring biased, so it now moves back toward its rest position. A carriage positioning mechanism is provided to intercept the carriage and stop it at a new tuning position. The delay before return movement starts ensures that the rotary stop in the carriage mechanism rotates far enough to be properly intercepted.

The construction and operation of the core positioning mechanism may be understood by a consideration of Figs. 4 and 5. Fig. 4 is a transverse sectional view taken along the line 4 of Fig. 3, and Fig. 5 is a longitudinal sectional view taken along the line 5 of Fig. 4. It may be noted that the selector mechanism is not at the manual station in Figs. 4 and 5. The core carriage shown here includes a spider member 66 having arms 77 extending toward the shell 67. Some of the arms 77 carry tuning cores 78 which extend into containers 79 in which the tuning coils are provided. As the carriage 66 is moved along selector shaft 21, the cores 78 are moved to different positions with respect to the tuning coils, and this controls the tuning of the radio receiver. A stop member 71 is rotatably mounted on a bearing or bushing 70 which is firmly seated in an opening 97 in the carriage 66 through which shafts 21 and 23 extend. There is a small projection 72 on the rotary stop member 71 which engages an abutment member 75-3 corresponding to the third selection station of the selector mechanism. There are a plurality of these abutment members designated 75-1 to 75-5, one for each of the automatic selection stations of the selector mechanism. The stop member 71 moves reciprocally with the carriage 66 and is connected to the selector shaft 21 by a key member 73 so that it is simultaneously rotated. This construction will be explained further, but it may be noted at this point that as the stop member 71 rotates, the projection 72 thereon follows different paths of reciprocal movement. The abutment members 75-1 to 75-5 are normally stationary and are located in these various paths at different points so as to intercept the projection 72 at different tuning positions along the return path of the carriage 66. The delay between forward and return movement of the carriage 66 provided by the flat points on the teeth of cam 14 previously described causes the lug or projection 72 to be rotated enough so that even if one of the abutments is positioned very near the limit of the carriage travel, the lug 72 will be aligned with it during return movement and will be properly intercepted. Each of the abutment members is carried on a worm screw 76 which may be turned to move the abutment member longitudinally of the tuner, and this permits adjustment to set up and change the different tuning positions.

Another one of the abutment members, designated 75–M, engages the stop member 71 when the selector mechanism is turned to the manual selection station. To provide manual tuning, the worm 76—M may be driven by the manual tuning shaft 23 through the gears 26 and 27. The gears illustrated here are a pinch type with the gear 26 having a channel which frictionally engages the disc 27. When the manual tuning knob 24 is turned, shaft 23 and worm screw 76—M rotate, and abutment member 75—M moves longitudinally. The carriage 66 may thus be moved to any desired position permitting continuous tuning which is auxiliary to the preset tuning. It may be noted that one of the worm screws 76 may be driven by a motor to provide auxiliary search tuning in a manner similar to the manual tuning mechanism of the construction illustrated here.

The movable parts of the core positioning mechanism are effectively guided. The shell portion 67 of the housing 11 may be provided with guide slots 69 similar to the guide opening 68 along which the roller 64 rides. The guide slots 69 receive one end of each of the abutment members 75–1 to 75–5 and 75—M to guide the movement thereof. The spider arm 77 which supports the cam follower 61 may be provided with a guide pin 82 in alignment with the tube 81 on the end plate 16. A coil spring 84 may be supported at one end in the tube 81 so that its other end is centered by the guide pin 82 and bears against the spider arm 77 to provide the return bias for the carriage 66. It may be noted that the spring 84 bears against an off-center portion of the carriage 66. Thus, the off-center forces exerted on cam follower 61 by the cam 14 are balanced by the oppositely directed force supplied by spring 84. It has been found that this helps to counteract any tendency of the cam to cock the spider 66 and cause it to bind. A wire spring having one end anchored in the housing 11 and the other connected to arm 77 adjacent roller 64 has also been used satisfactorily to provide return bias for the carriage.

The end-plate 17 may be provided with apertures 86 in alignment with each of the worm screws 76. An adjustment mechanism 87 may then be rotated with the selector mechanism into alignment with each of the worm screws 76 as the selector moves from station to station. In the construction illustrated, the adjustment mechanism 87 is provided by a traveling screwdriver 88 which is carried by the selector knob 22. When the manual tuning knob 24 is removed, the tip 89 of the screwdriver 88 may be pushed through the aperture 86 so that it engages a slot in the end of the worm screw 76. Thus, the screwdriver 88 may be turned manually to rotate the worm screw 76 and move the corresponding abutment member to the desired position. The screwdriver 88 is returned to its normal position by the spring 89. Of course, the adjustment mechanism 87 could be provided with a hexagonal or square end rotatable device and is not limited to a screwdriver of the particular configuration shown. By watching the visual indicator pointer 34 (Fig. 1) while operating the screwdriver 88, it is apparent to the operator when the tuning positions have been set to correspond to particular desired radio frequencies.

Figure 6:
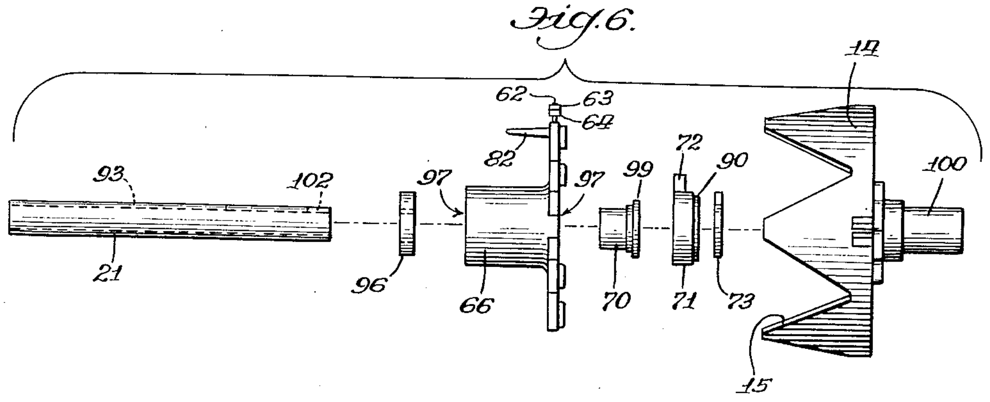
Figs. 6, 7 and 8 are detail views showing parts of the rotary selector control mechanism.
Figure 7:
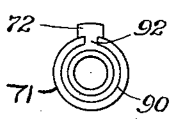
Figure 8:
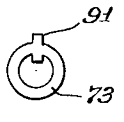

The details of the construction of the selector control mechanism which provides simultaneous reciprocal and rotational movement of the stop member 71 may be better understood by considering Figs. 6, 7 and 8 along with Fig. 5. The tubular selector shaft 21 is provided with a keyway 93 extending along a substantial portion of its length. The shaft 21 extends through an opening 97 through the hub of spider 66. A bearing 96, which permits sliding movement of the spider on shaft 21, is seated against a shoulder 98 and is held in place by peening over the end of the hub. Another bearing or bushing 70 is seated at the other end of the opening 97 and has a flange portion 99 which extends beyond the end of the carriage. Before the bushing 70 is inserted into opening 97, the stop member 71 is seated against the flange portion 99 with the rim 90 directed away from the carriage. The member 73 fits inside the rim 90 on stop member 71, and the key projections 91 extend through a slot 92 in rim 90 and also into keyway 93. Member 73 is held in place by peening over the edge or rim 90. The cam 14 is secured firmly on shaft 21. Knob 22 fits over the extension 100 of cam 14, and has a projection 101 which fits into a small slot 102 in the shaft 21. Thus, when knob 22 is turned, shaft 21, cam 14, and stop member 71 all rotate together. As the core carriage 66 moves longitudinally along shaft 21 as previously explained, key projection 91 slides along keyway 93 to permit reciprocal movement of the stop member as well as rotary movement.

Thus, a very compact preset tuner has been provided having a simple manual selector mechanism which cooperates with a manual tuning mechanism to provide both automatic and continuous tuning. The reduced size of the tuner as compared with previously known constructions is substantial and is due largely to an efficient cooperative arrangement of parts which is facilitated by the cup-like shape of the rotary cam and the direct connection between the cam and the rotary stop member. The visual indicator simplifies the setting up of stations for automatic selection, and the tone indicator provides a safety feature to aid the driver of the automobile in which the tuner is used to select the manual tuning position without distracting his attention from the road.

I claim:

1. A tuner for use with a radio receiver to provide automatic selection of predetermined radio frequencies, the radio receiver having a tuning circuit with adjustable reactance means which controls the tuning of the receiver within a frequency range, said tuner including in combination, a movable carriage coupled to the reactance means for controlling the tuning of the radio receiver upon movement through a range defined by first and second spaced positions, means for urging said carriage toward said first position, rotary selector control means including cam follower means on said carriage, and a rotary cam having a cylindrical toothed portion engageable with said cam follower means to move said carriage from said first position to said second position upon rotation thereof, and carriage positioning means including a carriage stop member movable reciprocally with said carriage and rotatable by said selector control means, and an adjustable abutment positioned to intercept said stop member at a preset position during its return movement to stop said carriage at a position corresponding to a predetermined frequency.

2. A tuner for use with a radio receiver to provide automatic selection of predetermined radio frequencies and to provide auxiliary selection of any frequency within a range, the radio receiver having a tuning circuit with adjustable reactance means which controls the tuning of the receiver within the frequency range, said tuner including in combination, a movable carriage coupled to the reactance means for controlling the tuning of the radio receiver upon movement between first and second spaced positions, a spring for urging said carriage toward said first position, a rotary stop member on said carriage, a plurality of adjustable abutments positioned to intercept said stop member at different points in the movement of said carriage from said second position toward said first position, rotary selector control means including a rotary toothed cam operatively connected to said carriage means for moving the same from each of said abutment members to said second position, said selector control means being operatively connected to said stop member to rotate the same into alignment with each of said abutment members for engaging the same successively, and auxiliary control means including gear means connected to one of said adjustable abutments for moving the same to drive said carriage means between said first and second positions when said stop member engages said one abutment member.

3. A tuner for use with a radio receiver to provide automatic selection of predetermined radio frequencies and to provide auxiliary manual selection of any frequency within a range, the radio receiver having a tuning circuit with adjustable reactance means which controls the tuning of the receiver within the frequency range, said tuner including in combination, a carriage coupled to the reactance means movable reciprocally to preset tuning positions, carriage positioning means including a plurality of spaced abutment members, and a stop plate rotatable on said carriage for defining said preset tuning positions, said abutment members each having a worm screw for positioning the same, a cylindrical shell with a guide slot therein, resilient means urging said carriage toward a rest position, rotary selector control means including cam follower means on said carriage and movable along said guide slot, a cam having a cylindrical portion concentric with said cylindrical shell and having a toothed edge engageable with said cam follower means to move said carriage reciprocally, and a tubular shaft slidably connected to said stop plate for rotating the same into alignment with said spaced abutment members to engage the same successively as said carriage moves reciprocally, and auxiliary control means including a manual control shaft within said tubular shaft of said selector control means, and gear means operatively connecting said manual control shaft with one of said worm screws for said abutment members for moving the same to drive said carriage through a range of movement when said selector control means is at a manual selection station.

4. A tuner for use with a radio receiver to provide automatic selection of predetermined radio frequencies and to provide auxiliary selection of any frequency within a range, the radio receiver having a tuning circuit with adjustable reactance means which controls the tuning of the receiver within the frequency range, said tuner including in combination, a movable carriage coupled to the reactance means for controlling the tuning of the radio receiver upon movement between first and second spaced positions, a spring for urging said carriage toward said first position, a rotary stop member on said carriage, a plurality of adjustable abutments positioned about said stop member to intercept the same at different points in the movement of said carriage from said second position toward said first position, cam follower means secured to said carriage and extending radially therefrom, support means having cylindrical portion with a slot therein receiving and guiding said cam follower means, a rotary cam having a cylindrical portion disposed around said cylindrical support means and having a toothed edge engageable with said cam follower means for moving said carriage from each of said abutment members to said second position, a shaft connected to said rotary cam and said stop member for rotating the same simultaneously so that said stop member engages said adjustable abutments successively at different preset tuning positions, auxiliary control means including gear means connected to one of said adjustable abutments for moving the same with said carriage means between said first and second positions when said shaft is rotated to a predetermined position, a vibrator reed on said rotary cam, and spring biased pawl means on said support means and engageable with said vibrator reed to vibrate the same when said shaft reaches said predetermined position for sounding a tone which announces that the tuner is conditioned for auxiliary operation.

5. A tuner for use with a radio receiver to provide automatic selection of predetermined radio frequencies, the radio receiver having a tuning circuit with adjustable reactance means for controlling the tuning of the receiver within a range of frequencies, said tuner including in combination, spring-biased carriage means coupled to the reactance means and movable reciprocally to preset tuning positions, carriage positioning means including a plurality of spaced abutment members and a stop plate rotatable on said carriage means for defining said preset tuning positions, said abutment members each having a worm screw for positioning the same, a cylindrical support having a plurality of elongated guide slots therein, said abutment members each having an end portion movable along one of said guide slots, selector control means including cam follower means on said carriage means and movable along one of said guide slots, and a cylindrical cam concentric with said cylindrical support and having a toothed edge engageable with said cam follower means to move said carriage means reciprocally, said selector control means being operatively connected to said stop plate for rotating the same into alignment with each of said spaced abutment members to engage the same successively as said carriage moves reciprocally.

6. A tuner for use with a radio receiver which has a tuning circuit with adjustable reactance means for controlling the tuning of the radio receiver within a range of radio frequencies, said tuner including in combination, carriage means coupled to the reactance means and movable reciprocally to successive tuning positions, carriage positioning means including spaced abutments and stop means rotatable on said carriage means for defining said tuning positions, a cylindrical shell having an elongated guide slot therein, rotary control means including split roller means on said carriage means having a first roller movable along said guide slot and having a second roller adjacent said guide slot, a rotary cam having a cylindrical portion concentric with said cylindrical shell and having a toothed edge engageable with said second roller to move said carriage means reciprocally, and a rotary shaft having a keyway for slidably receiving a portion of said stop means and for rotating the same into alignment with each of said spaced abutments to engage the same successively as said carriage moves reciprocally.

7. A tuner for use with a radio receiver which has a tuning circuit with adjustable reactance means for controlling the tuning of the radio receiver within a range of radio frequencies, said tuner including in combination, carriage means coupled to the reactance means and movable reciprocally to predetermined tuning positions, spring means having one end bearing against an off-center portion of said carriage means to urge the same toward a rest position, carriage positioning means including spaced abutments and stop means rotatable on said carriage means for defining said tuning positions, a housing having a cylindrical portion with an elongated guide opening therein, rotary selector control means including split roller means on said off-center portion of said carriage means having a first roller movable along said guide opening and having a second roller adjacent said guide opening, a cup-shaped cam having a cylindrical portion concentric with said cylindrical housing portion and having a toothed rim engageable with said second roller to move said carriage means reciprocally, and a shaft having a keyway for slidably receiving a portion of said stop means and for rotating the same into alignment with each of said spaced abutments for engaging the same successively as said carriage moves reciprocally.

8. A tuner for use with a radio receiver which has a tuning circuit including a plurality of coils with respective movable cores for controlling the tuning of the receiver within a range of radio frequencies, said tuner including in combination, a movable spider member having a hub and a plurality of spaced arms projecting radially from said hub, with the tuning cores being carried respectively on said arms of said spider member and aligned with said coils, a stop plate rotatably connected to said hub of said spider member, a cylindrical shell surrounding said projecting arms of said spider member and having a plurality of guide slots therein, a plurality of worm screws extending between said projecting arms of said spider member, an abutment member threadably connected to each of said worm screws having one end cooperating with said stop plate to define tuning positions for said spider member and having another end slidably movable along one of said guide slots, split roller means including first and second rollers carried on one of said arms of said spider member with said first roller being movable along one of said guide slots, resilient means urging said spider member toward a rest position, a cup-shaped cam having a cylindrical portion concentric with said cylindrical shell and having a toothed edge engageable with said second roller to move said spider member reciprocally, a tubular shaft extending through said hub of said spider member and having a keyway therein slidably keyed to said stop member for rotating the same into alignment with each of said spaced abutment members to engage the same successively as said spider member moves reciprocally, thereby permitting selection of preset tuning positions by rotation of said tubular shaft.

9. A tuner for use with a radio receiver which has a tuning circuit including adjustable reactance means for controlling the tuning of the receiver within a range of radio frequencies, said tuner including in combination, movable carriage means coupled to the reactance means for controlling the tuning of the radio receiver upon movement between first and second spaced positions, spring means for biasing said carriage means toward said first position, a rotary stop member on said carriage means, a plurality of abutment members movable between extreme positions corresponding to said first and second positions of said carriage means, a worm screw connected to each of said abutment members for positioning the same so as to intercept said stop member at different points in the movement of said carriage means from said second position towards said first position, rotary selector means including a rotary toothed cam operatively connected to said carriage means for moving the same from each of said abutment members to said second position, said selector means being operatively connected to said stop member to rotate the same successively into alignment with said abutment members to provide automatic selection of the preset stations, and adjustment means rotatable by said selector means into alignment with said worm screws for facilitating adjustment of said abutment members.

10. A tuner for use with a radio receiver to provide automatic selection of predetermined radio frequencies and to provide manual selection of any frequency within a range, the radio receiver having a tuning circuit including adjustable reactance means for controlling the tuning of the receiver within the frequency range, said tuner including in combination, carriage means coupled to the reactance means and movable reciprocally to preset tuning positions, carriage positioning means including a plurality of spaced abutment members and a stop plate rotatable on said carriage means for defining said preset tuning positions, a housing having a cylindrical portion with a plurality of guide slots therein, said abutment members each having an end slidably movable along one of said guide slots and having a worm screw for positioning the same, cam follower means on said carriage means and guided by another of said guide slots, resilient means urging said carriage means toward a rest position, a rotary cam having a cylindrical portion concentric with said cylindrical housing portion and having a toothed edge engageable with said cam follower means to move said carriage means reciprocally, a tubular shaft connected to said stop plate for rotating the same successively into alignment with said spaced abutment members as said carriage means moves reciprocally, a knob on said tubular shaft, a traveling screwdriver carried by said knob and movable therewith into alignment with said worm screws, said screwdriver being engageable with said worm screws and rotatable to adjust the position of said abutment members, a manual control shaft rotatable within said tubular shaft, and gear means operatively connecting said manual control shaft to one of said worm screws for said abutment members for rotating the same to drive said carriage means through its full range of movement when said tubular shaft is at a manual selection station.

11. In a tuner including a spring-biased core carriage which is movable reciprocally to successive tuning positions defined by a rotatable carriage stop member engageable with sequential spaced abutments, the combination therewith of cam follower means on the carriage, and a rotary cam having a cylindrical toothed edge engageable with said cam follower means to move the carriage reciprocally, said rotary cam having a shaft slidably keyed to the stop member for rotating the same into alignment with the spaced abutments to engage the same successively as the carriage reciprocates.

12. In a tuner including a spring-biased core carriage which is movable reciprocally to successive tuning positions defined by a rotary intercepting mechanism including a carriage stop and sequential spaced abutments, the combination therewith of rotary selector control means including roller means on the carriage, and a rotatable cam having a cylindrical toothed edge engageable with said roller means to move the carriage reciprocally, said rotary selector control means being directly connected to the intercepting mechanism for causing relative rotation between the carriage stop and the spaced abutments to engage the same successively as the carriage reciprocates.

13. In a tuner for use with an automobile radio receiver operable by the driver of the automobile and having a carriage movable to different tuning positions for selecting different frequencies within a range of frequencies, the combination including rotary selector control means operable manually to move the carriage automatically to preset positions to provide selection of predetermined frequencies, auxiliary control means operable when said rotary selector control means is in a predetermined position to move the carriage through a range of movement to provide auxiliary selection of any signal within the range of frequencies, and tone indicator means actuated by said rotary selector control means as it is rotated to said predetermined position to sound a tone which is clearly audible over the operating noise of the automobile to indicate to the driver that said auxiliary control means is conditioned for operation.

14. In a tuner including a spring-biased core carriage which is movable reciprocally to successive tuning positions defined by a rotary intercepting mechanism including a carriage stop and sequential spaced abutments, the combination therewith of rotary selector means including cam follower means on said carriage, a rotatable cam having a cylindrical toothed edge engageable with said cam follower means to move the carriage reciprocally, said rotary selector means being directly connected to the intercepting mechanism for causing relative rotation between the carriage stop and the spaced abutments to engage the same successively as the carriage reciprocates, auxiliary control means for moving one of the abutments with the carriage through the full range of movement thereof to provide auxiliary tuning when said selector means is rotated to a predetermined position, a vibrator reed carried on said rotary cam of said selector means, and spring-biased means in the path of said reed, said spring-biased means being pivotal when said selector means leaves said predetermined position and being fixed when said selector means approaches said predetermined position to vibrate said reed, thereby sounding a tone which indicates to the operator that the tuner is conditioned for auxiliary operation.

15. In a tuner including a spring-biased core carriage which is movable reciprocally to successive tuning positions defined by a rotary intercepting mechanism including a carriage stop and adjustable spaced abutments, the combination therewith of rotary selector means including cam follower means on the carriage, a rotatable cam having a cylindrical toothed edge engageable with said cam follower means to move the carriage reciprocally, said rotary selector means being directly connected to the intercepting mechanism for causing relative rotation between the carriage stop and the spaced abutments to engage the same successively at different preset tuning positions as the carriage reciprocates, auxiliary control means for moving one of the abutments with the carriage through the full range of movement thereof to provide auxiliary tuning when said selector means is rotated to a predetermined position, a vibrator reed carried on a rotary part of said selector means, striker means held fixed in the path of said reed as said selector means approaches said predetermined position to vibrate said reed and sound a tone which announces the condition of the tuner, and visual indicator means including a pivotal member having a pointer arm and a driver arm connected to the carriage for visually identifying the radio frequencies corresponding to said preset tuning positions to facilitate setting up the same.

16. In a tuner including a resiliently biased carriage which is movable reciprocally to successive tuning positions defined by a rotary intercepting mechanism including angularly spaced abutments and a carriage stop member engageable therewith, the combination therewith of cam follower means coupled to the carriage, a rotary cam having a cylindrical toothed edge engageable with said cam follower means to move said carriage reciprocally through a range of movement, means coupling said cam to said intercepting mechanism for causing relative rotation between the stop member and the spaced abutments to engage the same successively as said cam is rotated, and manual actuating means connected to said cam for rotating the same to a plurality of tuning stations.

References Cited in the file of this patent

UNITED STATES PATENTS

| | | |
|---|---|---|
| 2,533,810 | Jacob et al. | Dec. 12, 1950 |
| 2,580,895 | Tar | Jan. 1, 1952 |